United States Patent [19]
Kanao

[11] Patent Number: 5,329,973
[45] Date of Patent: Jul. 19, 1994

[54] RIGID POLYVINYL CHLORIDE PIPE

[76] Inventor: Shiro Kanao, No. 9-18, Nanpeidai 4-chome, Takatsuki-shi, Osaka, Japan

[21] Appl. No.: 139,044

[22] Filed: Oct. 21, 1993

Related U.S. Application Data

[63] Continuation of Ser. No. 780,936, Oct. 23, 1991, abandoned.

[30] Foreign Application Priority Data

Oct. 24, 1990 [JP] Japan ............... 2-287671

[51] Int. Cl.⁵ .............................. F16L 9/16
[52] U.S. Cl. .................... 138/154; 138/122; 138/129; 138/150
[58] Field of Search ............ 138/122, 129, 135, 150, 138/154

[56] References Cited

U.S. PATENT DOCUMENTS

| | | | |
|---|---|---|---|
| 1,294,465 | 2/1919 | Horvath | 138/154 |
| 3,273,600 | 9/1966 | Swan | 138/154 |
| 3,280,851 | 10/1966 | Habdas | 138/154 |
| 3,340,901 | 9/1967 | Lombardi | 138/135 |
| 3,926,223 | 12/1975 | Petzetakis | 138/129 |
| 4,121,624 | 10/1978 | Chen | 138/129 |
| 4,383,555 | 5/1983 | Finley | 138/122 |
| 4,928,735 | 5/1990 | Richards | 138/122 |

FOREIGN PATENT DOCUMENTS 1483914 4/1966 France .................. 138/129

Primary Examiner—Timothy F. Simone
Assistant Examiner—Terrence R. Till
Attorney, Agent, or Firm—Sughrue, Mion, Zinn, Macpeak & Seas

[57] ABSTRACT

A rigid polyvinyl chloride pipe comprises a strip member A that comprises a rigid polyvinyl chloride strip 1 with a U-shaped cross section consisting of an intermediate portion 1a of a predetermined width having a generally flat surface on at least one lateral side and two ribs 1b that extend from opposite sides of the intermediate portion 1a in a generally perpendicular direction with respect to the intermediate portion, with a layer of flexible synthetic resin 2 highly fusible to the rigid polyvinyl chloride resin being fused integrally to substantially the entire outer surface of the lateral side of both ribs 1b. The strip member A is wound spirally to be positioned in such a way that the U-shaped concave portion 3 of the rigid strip 1 is open radially outward and that the flexible synthetic resin layer 2 is interposed between the mating surfaces of two adjacent ribs 1b so that the ribs 1b are fused together by means of the flexible synthetic resin layer 2 in such a way that the width (w) of the flexible synthetic resin layer 2 is generally equal to or smaller than the width (W) of the ribs 1b as they are joined together.

8 Claims, 2 Drawing Sheets

RIGID POLYVINYL CHLORIDE PIPE

This is a Continuation of application Ser. No. 07/780,936 filed Oct. 23, 1991, now abandoned.

BACKGROUND OF THE INVENTION

This invention relates to a rigid polyvinyl chloride pipe having smooth inner peripheral surfaces, more particularly, to a pipe having a structure adapted for large-diameter design.

Conventional rigid polyvinyl chloride pipes are produced by extrusion molding and they have smooth inner and outer surfaces with uniformity in wall thickness along the entire length. Such "straight" rigid polyvinyl chloride pipes having various advantages including fairly good weather resistance due to the nature of the constituent material, easy availability of the material and ease in manufacture. Because of these advantages, the pipes have been produced and sold on the market in large quantities for many years. However, most of the commercially available straight, rigid polyvinyl chloride pipes are small in diameter.

In spite of their small diameter, the conventional straight, rigid polyvinyl chloride pipes have to be formed in comparatively large wall thickness in order to satisfy the requirements for high resistance to pressure and impact. To this end, the resin material must be used in a large quantity but then not only does the pipe weight increase but also the increase in production cost is inevitable. Further, if one wants to produce a pressure-resistant straight pipe of large diameter, the wall thickness must be increased but, again the increase in the use of resin material, the pipe weight and production cost is inevitable. As long as the straight geometry is adopted, it has been impossible to eliminate those disadvantages from the conventional straight pipes.

There is another problem that is peculiar to rigid polyvinyl chloride; that is, two sheets of rigid polyvinyl chloride cannot be completely bonded together even if they are molten and the joint will easily delaminate or separate.

SUMMARY OF THE INVENTION

The present invention has been achieved under these circumstances in order to solve the aforementioned problems of the conventional straight pipes using rigid polyvinyl chloride resins that have the above-mentioned disadvantage but yet which have the advantage of easy availability and high weather resistance. An object, therefore, of the present invention is to provide a rigid polyvinyl chloride pipe that has a sufficient pressure resistance to withstand use under the ground even if it has a large diameter and yet which can be manufactured as a light-weight pipe by substantially reducing the use of the constituent material.

To attain this object, the present invention provides a rigid polyvinyl chloride pipe which, as shown in FIGS. 1–3, comprises a strip member A that comprises a rigid polyvinyl chloride strip 1 with a U-shaped cross section consisting of an intermediate portion 1a of a predetermined width having a flat surface on one lateral side and two ribs 1b that extend from opposite sides of said intermediate portion 1a in a generally perpendicular direction with respect to said intermediate portion, with a layer flexible synthetic resin 2 highly fusible to the rigid polyvinyl chloride resin being fused integrally to substantially the entire outer surface of the lateral side of either one or both ribs 1b, said strip member A being wound spirally to be positioned in such a way that the U-shaped concave portion 3 of rigid strip 1 is open radially outward and that the flexible synthetic resin layer 2 is interposed between the mating surfaces of two adjacent ribs 1b so that said ribs 1b are fused together by means of said flexible synthetic resin layer 2 in such a way that the width (w) of the flexible synthetic resin layer 2 is generally equal to or smaller than the width (W) of said ribs 1b as they are joined together.

Having the structure described above, the rigid polyvinyl chloride pipe of the present invention is characterized in that the ribs 1b extending radially outward will counteract an external pressure applied in the radial direction of the pipe while at the same time the joined ribs 1b cooperate with each other to counteract an externally applied force. Hence, the external force will not act directly on the tubular portion of the pipe and sufficient resistance to pressure and impact is insured even if the intermediate portion 1a and the ribs 1b which are made of a rigid polyvinyl chloride resin are totally formed in a small wall thickness. On the other hand, at least the under side of the intermediate portion 1a positioned between the ribs 1b is formed to be generally flat, such that the inside surface of the pipe is as smooth as the conventional straight pipes so as to be suitable for the transport of fluids.

DETAILED DESCRIPTION OF THE PREFERRED EMBODIMENTS

The preferred embodiments of the present invention are described below with reference to the accompanying drawings.

Figure 1:
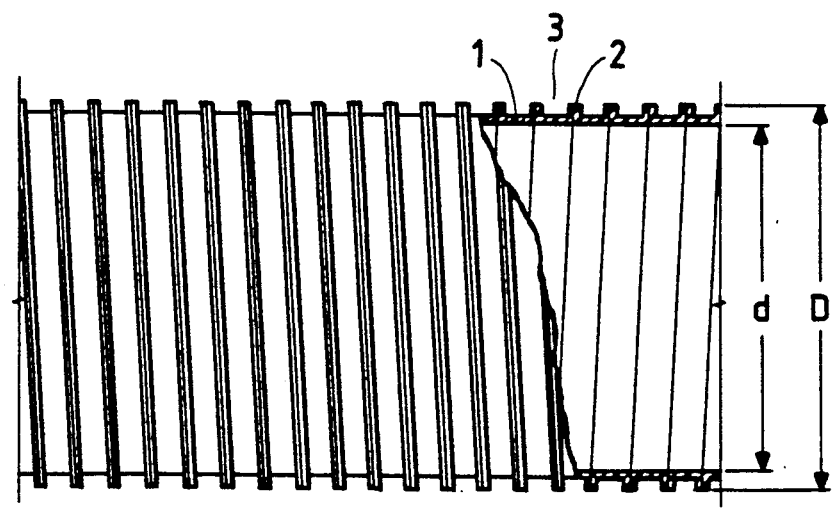
FIG. 1 is a front view, with part taken away, of a rigid polyvinyl chloride pipe according to an embodiment of the present invention.
Figure 2:
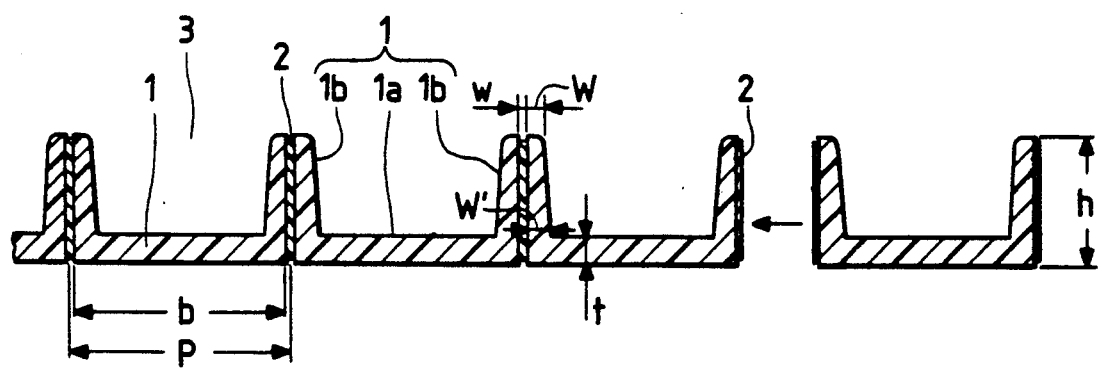
FIG. 2 is a longitudinal section of the wall of the pipe shown in FIG. 1.
Figure 3:
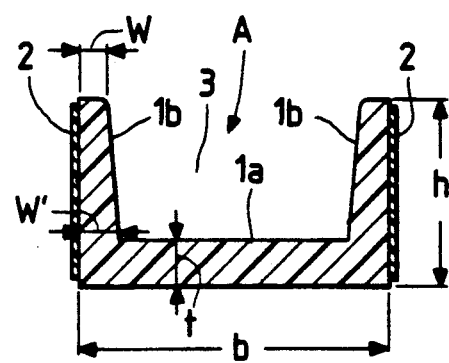
FIG. 3 is a longitudinal section of a strip member which is the building block of the pipe shown in FIG. 1.

FIGS. 1–3 show the first embodiment of the present invention. Shown by 1 is an elongated strip made of rigid polyvinyl chloride resin (hereunder referred to as "rigid PVC") that has a generally U-shaped cross section and that consists of a flat intermediate portion 1a and two ribs 1b that extend in one lateral direction (upward in FIGS. 2 and 3) from opposite sides of the intermediate portion 1a. The ribs 1b are formed in such a way that the outer surface of the lateral side of each rib is perpendicular to the intermediate portion 1a whereas the inner surface of said lateral side is slightly inclined to be broad at the proximal end and to taper towards the distal end. The entire part of the outer surface of the lateral side of each rib 1b except the very small area at each of the top and bottom ends has a layer of flexible polyvinyl chloride resin 2 (hereunder referred to as "flexible PVC") fused integrally to form a strip member A. The flexible PVC is a material that is highly fusible to the rigid PVC. With the flexible PVC fused integrally to the outer surfaces of the ribs 1b, the strip member A is extruded from an extruder of synthetic resins and wound spirally onto the mandrel of a tubing machine in such a way that the U-shaped concave portion 3 of the rigid strip 1 of each turn is open radially outward whereas the layers of flexible PVC 2 fused to adjacent ribs 1b contact each other to be fused together, whereby said adjacent ribs 1b are successively joined together to form a pipe P.

As shown in FIG. 2, the width (w) of each flexible PVC layer 2 in the so formed pipe P is smaller than the width (W) of each rib 1b.

We now describe the measured dimensions of the pipe P fabricated in accordance with the first embodiment and those of the strip member A which is the building block of the wall of that pipe P. As shown in FIG. 2, the intermediate portion 1a of the rigid strip 1 has a width (b) of 29.3 mm and a wall thickness (t) of 3.80 mm; the rib 1b has a height (h) of 18.5 mm, a width (W) of 3.22 mm at the distal end and a width (W') of 4.15 mm at the proximal end; the flexible PVC layer has a width (w) of 0.90 mm and the pitch (p) of two adjacent flexible PVC layers is 30.2 mm. As shown in FIG. 1, the pipe P has an inside diameter (d) of 318.6 mm and an outside diameter (D) of 355.6 mm as measured between the distal ends of diametric ribs.

The pipe P having the construction described above was subjected to a test of comparison with a commercial straight pipe having a nominal diameter of 300 mm that was formed of the same rigid PVC as was used in making the rigid strip 1. The results are shown in the following table.

FIG. 1. This pipe had an inside diameter (d) of 350.1 mm and an outside diameter (D) of 386.6 mm as measured between the distal ends of diametric ribs.

This pipe P was subjected to a test of comparison with a commercial straight pipe having an nominal diameter of 350 mm that was formed of the same rigid PVC as was used in making the rigid strip 1. The results are shown in the following table.

|  | 5% flattened | | 10% flattened | | | | |
|---|---|---|---|---|---|---|---|
|  | Flattening load (kg) | Stiffness (kg/cm²) | Flattening load (kg) | Stiffness (kg/cm²) | i.d. (mm) | o.d. (mm) | weight (kg) |
| Sample of the invention | 384 | 4.00 | 707 | 3.66 | 350.1 | 386.5 | 5.56 |
| Commericial pipe (VUφ300) | 363 | 3.93 | 671 | 3.63 | 347.7 | 369.7 | 9.16 |

*Pipe length = 500 mm

This data shows that the pipe of the present invention had higher pressure resistance than the conventional pipe as evidenced by approximately 1.8% improvement in terms of 5% flattening strength and approximately 0.8% improvement in terms of 10% flattening strength. Yet, the pipe of the present invention was lighter in weight and achieved approximately 39% saving on the constituent material.

Figure 4:
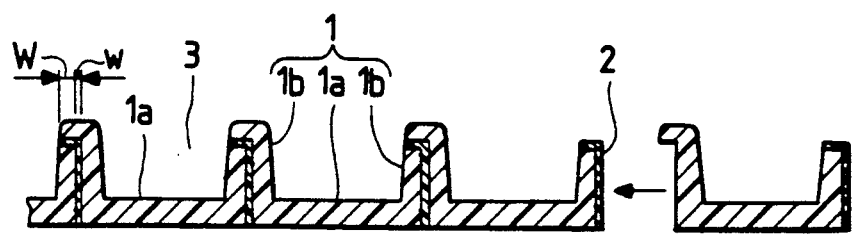
FIG. 4 is a longitudinal section of the wall of a rigid polyvinyl chloride pipe according to another embodiment of the present invention.
Figure 5:
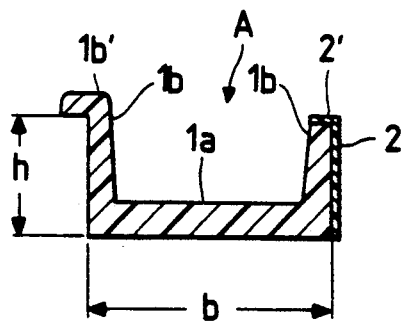
FIG. 5 is a longitudinal section of a strip member which is the building block of the pipe shown in FIG. 4.

FIGS. 4 and 5 show the second embodiment of the present invention, in which the strip member A as the building block of a pipe is such that a flexible PVC layer 2 is fused to only one of the two ribs 1b (in the case shown, the right rib) formed at opposite sides of the intermediate portion 1a.

In the case shown, a flexible PVC layer 2' is also formed on top of the right rib 1b and the left rib 1b has a lip 1b' that extends outwardly from the top. The strip member A is wound in such a way that the lip 1b' of the left rib 1b will cover the top surface of the right rib 1b of the immediately preceding turn of strip member A to be fused integrally with the flexible PVC layer 2' on top of the right rib 1b.

The strip member A used in the second embodiment has a uniform wall thickness of approximately 3 mm in each of the intermediate portion 1a and rib 1b. The flexible PVC layer 2 has a thickness of 1 mm. The width (b) of the intermediate portion 1a of the strip 1 and the

|  | 5% flattened | | 10% flattened | | | | |
|---|---|---|---|---|---|---|---|
|  | Flattening load (kg) | Stiffness (kg/cm²) | Flattening load (kg) | Stiffness (kg/cm²) | i.d. (mm) | o.d. (mm) | weight (kg) |
| Sample of the invention | 561 | 6.31 | 970 | 5.46 | 318.6 | 355.6 | 5.55 |
| Commericial pipe (VUφ300) | 332 | 4.17 | 608 | 3.82 | 299.6 | 317.6 | 6.48 |

*Pipe length = 500 mm

This data shows that the pipe of the present invention was approximately 14.4% lighter than the conventional pipe but that it had higher pressure resistance as evidenced by approximately 51% improvement in terms of 5% flattening strength and approximately 43% improvement in terms of 10% flattening strength.

A larger-diameter sample of pipe P was fabricated using the strip member A of the structure shown in height (h) of the rib 1b satisfy the relationship of b≃2h.

Figure 6:
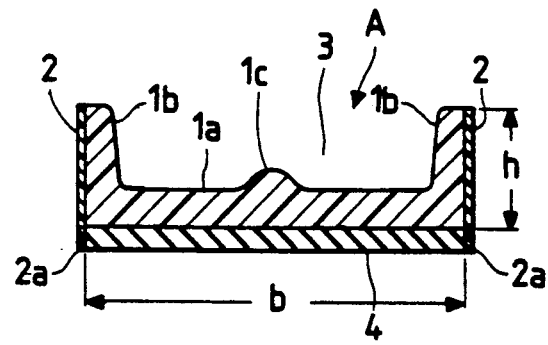
FIGS. 6–8 are longitudinal sections of strip members which are the building blocks of rigid polyvinyl chloride pipes according to other embodiments of the present invention.

FIG. 6 shows a rigid PVC pipe according to another embodiment of the present invention. As shown, the intermediate portion 1a of a strip 1 has a central ridge 1c and the width (b) of the intermediate portion 1a and the height (h) of the rib 1b satisfy the relationship of b≃3h. The strip I member A has such a structure that a wear-resistant rubber layer 4 is fused integrally to the back side (in the case shown, the bottom side) of the intermediate portion 1a while, at the same time, a flexible PVC layer 2a is also fused integrally to the outer surface of each lateral side of the rubber layer 4.

A pipe constructed using the strip member A according to the embodiment described above has the wear-resistant rubber layer formed on the inner surface, so it is suitable for use in dredging and grain transport applications where the inner surfaces of the pipe are subject to extensive wear by slurries or powder and granular materials.

Figure 7:
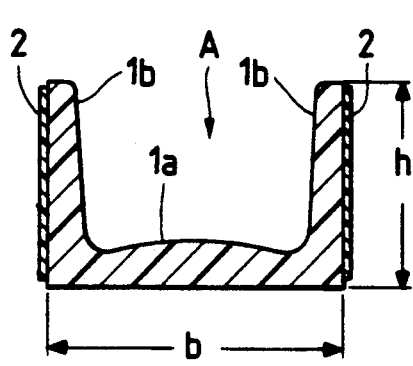

FIG. 7 shows a rigid PVC pipe according to still another embodiment of the present invention. As shown, the intermediate portion 1a of a strip 1 is curved outwardly in such a way that the curvature decreases toward a point midway between the ribs 1b which extend from opposite ends of the intermediate portion. The width (b) of the intermediate portion 1a and the height (h) of the rib 1b satisfy the relationship of $b \approx 1.4h$.

Figure 8:
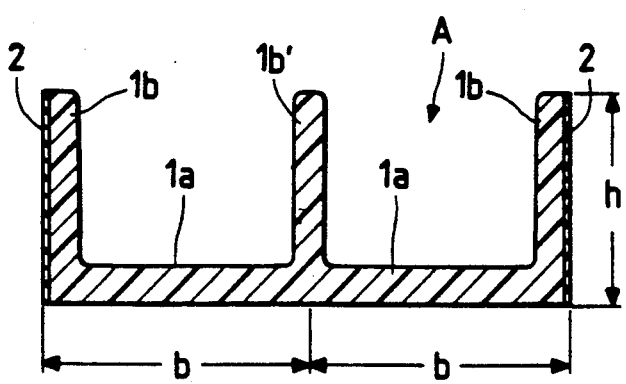

FIG. 8 shows a rigid PVC pipe according to a further embodiment of the present invention. As shown, the intermediate portion 1a of a strip 1 has a central rib 1b' in addition to the ribs 1b formed on opposite sides. The width (b) of the intermediate portion 1a as defined by the rib 1b and the central rib 1b' and the height (h) of the rib 1b satisfy the relationship $b \approx 1.2h$.

The ribs 1b or 1b' formed in the present invention may be of such a shape that they each have a lip at the distal end that extends towards the center of intermediate portion 1a.

In the embodiment described above, flexible PVC is used as the "flexible synthetic resin" but it should be understood that any other resin material that is flexible and that is highly fusible to rigid PVC may be used, as exemplified by a vinyl acetate/vinyl chloride copolymer and polyurethane.

The term "rigid PVC" as used in the present invention means those grades of PVC which have a Shore D hardness of at least 65 and which have a plasticizer mixed in an amount of up to 10% of the weight of PVC. The term "flexible PVC" means those grades of PVC which have a Shore A hardness of 50–100 and which have a plasticizer mixed in an amount of 15–50% of the weight of PVC.

In order to further reduce the use of rigid PVC as the principal constituent material or to increase the flattening strength of the pipe as an index of its pressure resistance, the strip 1 used as the building lock of the pipe may have a thin sheet of metal such as iron, steel or stainless steel embedded in its interior.

The width (w) of the flexible synthetic resin layer is preferably thin enough to work as a binder of the ribs and the typical value is within the range of approximately 0.5–5 mm. If the width (w) is greater than 10 mm, the flexible portion of interest is prone to break under shear stress that results from a local external force exerted upon the pipe wall. Further, the flexible portion will experience accelerated deterioration with time due to dehydrochlorination. In other words, the flexible portion by itself can shorten the service life of the pipe. The flexible synthetic resin as a binder of the ribs may be provided with a different color from the rigid PVC and this contributes to the production of a pipe having good aesthetic appeal.

The relationship between the width (b) of the intermediate portion 1a of the rigid PVC strip 1 and the height (h) of the rib 1b is preferably adjusted to range from $b \approx 3h$ (FIG. 6) to $b \approx 1.2h$ (FIG. 8). If the height (h) of the rib 1b is smaller than the limit of $b \approx 4h$, the flattening strength of the pipe as an index of its pressure resistance will decrease and it becomes necessary to increase the wall thickness of the strip 1. If the height (h) of the rib 1b is increased to the limit of $b \approx h$, a larger amount of resin material must be used to form the ribs 1b and one of the objects of the present invention, i.e., substantial reduction in the use of resin materials, cannot be attained.

While representative embodiments of the present invention have been described above, it should be understood that the present invention is by no means limited to those embodiments and various modifications can be made to the extent that the constituent elements of the present invention are included, that the objects of the invention are attained and that the advantages to be described just below are accomplished.

As described on the foregoing pages, the pipe of the present invention comprises a strip member that comprises a rigid PVC strip with a U-shaped cross section consisting of an intermediate portion and two ribs that extend from opposite sides of said intermediate portion towards one lateral side in a generally perpendicular direction, with a layer of flexible synthetic resin being fused integrally to substantially the entire outer surface of the lateral side of each rib. The strip member is wound spirally in such a way that the flexible synthetic resin layer works as a binder of adjacent turns of the strip member. Because of this arrangement, a pipe can be fabricated by merely winding the single strip member and yet adjacent turns of said strip member can be positively joined by fusion. Further, the strip member with a U-shaped cross section has the additional advantage of providing a sufficiently large area of fusion to permit easy joining of successive turns of the strip member. This contributes to easy and high-volume production of large-diameter pressure-resistant pipes for use under the ground.

In addition, the presence of adjacent ribs renders the resulting pipe to be more pressure-resistant than the conventional straight pipes, so that the use of the rigid PVC can be substantially reduced. As a result, large-diameter and yet lighter pipes can be produced.

As a further advantage, the width of the flexible synthetic resin layer in the pipe of the present invention is adjusted to be not greater than the width of the rib formed on each side of the intermediate portion of the strip. Therefore, even if a local external force is exerted on the wall of the pipe, the flexible synthetic resin layer will not be broken under shear stress. The external force will act on the ribs but will not act directly on the tubular portion of the pipe wall, namely, the intermediate portion of the strip member. Hence, the pipe of the present invention can be effectively used over an extended period without experiencing any local failure.

What is claimed is:

1. A rigid polyvinyl chloride pipe comprising a strip member (A) that comprises:
    a rigid polyvinyl chloride resin strip (1) with a U-shaped cross section consisting of an intermediate portion (1a) of a predetermined width having a generally flat surface on at least one lateral side and two ribs (1b) that extend from opposite sides of said intermediate portion (1a) in a generally perpendicular direction with respect to said intermediate portion; and a layer of flexible synthetic resin (2), which is highly fusible to the rigid polyvinyl chloride resin, being fused integrally to substantially the entire outer surface of a lateral side of either one or both ribs (1b), (1);

wherein said strip member (A) is wound spirally to be positioned in such a way that said generally flat surface faces inwardly to form an interior of said rigid polyvinyl chloride pipe, the U-shaped concave portion (3) of said rigid strip (1) is open radially outward and that the flexible synthetic resin layer (2) is interposed between the mating surfaces of two adjacent ribs (1b) so that said adjacent ribs (1b) are fused together by means of said flexible synthetic resin layer (2) in such a way that the width (w) of the flexible synthetic resin layer (2) is generally equal to or smaller than the width (W) of each of said ribs (1b) as said adjacent ribs are joined together, in which the rigid polyvinyl chloride resin has a Shore D hardness of at least 65 and the flexible synthetic resin has a Shore A hardness of 50-100.

2. A rigid polyvinyl chloride pipe according to claim 1, in which said flexible synthetic resin layer (2) is fused to only one of said two ribs (1b), a second flexible synthetic resin layer (2') is also formed on top of said one of said two ribs (1b), and the other one of said two ribs has a lip (1b') which extends outwardly from the top.

3. A rigid polyvinyl chloride pipe according to claim 2, in which the width (b) of said intermediate portion (1a) of said strip (1) and the height (h) of the rib (1b) satisfy the relationship of $b \approx 2h$.

4. A rigid polyvinyl chloride pipe according to claim 1, in which said intermediate portion (1a) of said strip (1) has a central ridge (1c) and the width (b) of said intermediate portion (1a) and the height (h) of the rib (1b) satisfy the relationship of $b \approx 3h$.

5. A rigid polyvinyl chloride pipe according to claim 1, in which an outer lateral surface of said intermediate portion (1a) of said strip (1) is curved outwardly in such a way that the curvature decreases toward a point midway between the ribs (1b) which extend from opposite sides of said intermediate portion (1a).

6. A rigid polyvinyl chloride pipe according to claim 5, in which the width (b) of the intermediate portion (1a) and the height (h) of the rib (1b) satisfy the relationship of $b \approx 1.4h$.

7. A rigid polyvinyl chloride pipe according to claim 1, in which said intermediate portion (1a) of said strip (1) has a central rib (1b') in addition to the ribs (1b) formed on opposite sides.

8. A rigid polyvinyl chloride pipe according to claim 7, in which the width (b) of the intermediate portion (1a) as defined by the rib (1b) and the central rib (1b') and the height (h) of the rib (1b) satisfy the relationship $b \approx 1.2h$.

* * * * *